US012021392B2

(12) United States Patent
Kreuzer

(10) Patent No.: US 12,021,392 B2
(45) Date of Patent: Jun. 25, 2024

(54) SYSTEM FOR WIRELESSLY SUPPLYING A ROTATING DEVICE WITH ELECTRICAL ENERGY

(71) Applicant: Hottinger Baldwin Messtechnik GmbH, Darmstadt (DE)

(72) Inventor: Manfred Kreuzer, Welterstadt (DE)

(73) Assignee: Hottinger Brüel & Kjaer GmbH, Darmstadt (DE)

( * ) Notice: Subject to any disclaimer, the term of this patent is extended or adjusted under 35 U.S.C. 154(b) by 867 days.

(21) Appl. No.: 16/959,920

(22) PCT Filed: Dec. 18, 2018

(86) PCT No.: PCT/DE2018/000378
§ 371 (c)(1),
(2) Date: Dec. 15, 2020

(87) PCT Pub. No.: WO2019/134720
PCT Pub. Date: Jul. 11, 2019

(65) Prior Publication Data
US 2022/0337086 A1    Oct. 20, 2022

(30) Foreign Application Priority Data
Jan. 3, 2018    (DE) ..................... 10 2018 000 030.4

(51) Int. Cl.
*H02J 50/00* (2016.01)
*H01F 38/18* (2006.01)
(Continued)

(52) U.S. Cl.
CPC ............ *H02J 50/005* (2020.01); *H01F 38/18* (2013.01); *H02J 50/00* (2016.02); *H02J 50/10* (2016.02);
(Continued)

(58) Field of Classification Search
CPC ......... H01F 38/18; H02J 50/00; H02J 50/005; H02J 50/10
See application file for complete search history.

(56) References Cited

U.S. PATENT DOCUMENTS 3,441,886 A    4/1969   Tveter
6,445,270 B1 *  9/2002  Ogasawara ............. H01F 38/14
                                                            336/212
(Continued)

FOREIGN PATENT DOCUMENTS

CN    200966010 Y    10/2007
DE    7506469 U    11/1976
(Continued)

OTHER PUBLICATIONS

International Search Report issued by the European Patent Office in International Application PCT/DE2018/000378 dated Jun. 14, 2019.

*Primary Examiner* — Rexford N Barnie
*Assistant Examiner* — Rasem Mourad
(74) *Attorney, Agent, or Firm* — Henry M. Feiereisen LLC

(57) ABSTRACT

A system for wirelessly supplying electric energy to a rotating device includes a flange disk, a disk-shaped ring, an annular plastic filling, a receiving coil which is embedded in the annular plastic filling, a U-shaped ferrite core having a short section, the end face of which is directed to the plastic filling, a long section which is oriented parallel to the short section and which extends parallel along the outer surface of the annular plastic filling, with the sections connected to one another via a section, a coil system and a receiving coil made of revolving wire windings. A distance of the end face of the long section from the rotation axis of the flange disk is smaller than a distance of the receiving coil from the rotation axis of the flange disk.

5 Claims, 11 Drawing Sheets

(51) Int. Cl.
*H02J 50/10* (2016.01)
*H02J 50/70* (2016.01)
*H02K 11/00* (2016.01)

(52) U.S. Cl.
CPC .......... *H02J 50/70* (2016.02); *H02K 11/0094* (2013.01)

(56) References Cited

U.S. PATENT DOCUMENTS

| | | | |
|---|---|---|---|
| 2007/0080770 A1* | 4/2007 | Fortsch | H02J 50/005 336/132 |
| 2009/0189459 A1* | 7/2009 | Seefried | H01F 38/14 307/104 |
| 2009/0280743 A1* | 11/2009 | Gast | H04B 7/0682 455/66.1 |
| 2010/0307218 A1* | 12/2010 | Meuter | G01L 25/003 73/1.09 |
| 2012/0280777 A1 | 11/2012 | Robert | |
| 2020/0051737 A1* | 2/2020 | Han | H02J 50/12 |

FOREIGN PATENT DOCUMENTS

| | | |
|---|---|---|
| DE | 202010018107 | 12/2014 |
| EP | 0 511 082 | 10/1992 |
| EP | 2 083 407 | 7/2009 |
| EP | 2 116 324 | 11/2009 |
| JP | S 58-220410 | 12/1983 |

* cited by examiner

SYSTEM FOR WIRELESSLY SUPPLYING A ROTATING DEVICE WITH ELECTRICAL ENERGY

CROSS-REFERENCES TO RELATED APPLICATIONS

This application is the U.S. National Stage of international Application No. PCT/DE2018/000378, filed Dec. 18, 2018, which designated the United States and has been published as international Publication No, WO 2019/134720 A1 and which claims the priority of German Patent Application, Serial No. 10 2018 000 030.4, filed Jan. 3, 2018, pursuant to 35 U.S.C. 119(a)-(d).

BACKGROUND OF THE INVENTION

The invention relates to a system for wirelessly supplying a rotating device with electrical energy according to patent class IPC H0 J50/00 and specifically to a system for reducing magnetic stray fields according to patent class IPC H 02 J 50/70.

For the energy supply of so-called torque measuring flanges, the energy is transferred inductively, i.e. transferred without contact. The energy transfer in the so-called near field range is particularly effective and has a very good efficiency. The distance between transmitting and receiving coils should be as small as possible. Any increase in the distance between the transmitting and receiving coils increases the electromagnetic stray flow and as a result a reduction in the efficiency. It is known that such systems react very sensitively to so-called changes in geometry, i.e., e.g., on large component tolerances. Various electronic compensation circuits are known from the prior art to compensate the influence of changes in geometry. Such compensation circuits are described e.g. in the document DE 202010018107 U1 "Self-balancing stator antenna for optimized contactless energy transfer in near-field telemetry system". It should be noted that fluctuations in the energy transfer can arise when the inductive conditions change periodically due to a periodic change in geometry, which is typical for rotating systems. Another change in geometry is encountered e.g. at thermal expansion, so that e.g. the size of the air gap between the transmitting coil and the receiving coil changes. It should be noted that it is relatively complex to secure electronic circuits to compensate fluctuations in the transmitted energy in a vibration-proof manner in the rotor of a system, such as e.g. an engine test bench, since in this case the rotor speed is very high.

Another source of interference are external electromagnetic fields that can act on the receiving coil and thereby induce undesired parasitic voltages. Such effects can be encountered e.g. in electric vehicle drives, because the components of such drives are oftentimes arranged very closely to one another, so that such external sources of interference are in immediate proximity of the receiving coil of the near-field telemetry device.

In principle, it is more appropriate to prevent fluctuations in the energy or power transfer through internal and external influences, rather than compensating the effects of fluctuations afterwards.

Thus, there is the object to minimize geometry-based impacts and external interferences in a system for wirelessly supplying a rotating device with electrical energy.

SUMMARY OF THE INVENTION

This object is achieved with a system for wirelessly supplying a rotating device with electrical energy, wherein the system includes:

A flange disk with an outer end face and an inner end face, with the flange disk being one of the two flange disks of a torque measuring flange and made of steel, titanium or aluminum or of another metal or of an alloy with comparable properties. A disk-shaped ring with an inner side and an outer side, with the outer side of the disk-shaped ring lying in a plane with the inner end face of the flange disk. A ring-shaped plastic filling, which is attached to the circumferential surface of the flange disk and has an outer surface which lies in the same plane in relation to the outer end face of the flange disk. A receiving coil made of revolving wire windings and embedded in the ring-shaped plastic filling. A U-shaped ferrite core with a short section which has an end face directed towards the plastic filling, and a long section which is oriented parallel to the short section and extends parallel along the outer surface of the ring-shaped plastic filling, with the two sections being connected to one another via a horizontal section. The distance between the end face of the long section and the rotation axis of the flange disk is smaller than the distance between the receiving coil and the rotation axis of the flange disk.

When a voltage is applied to an induction coil system that is in an inductive operative connection with the ferrite core, a magnetic energy flow is formed between the end face of the short section and the end face of the long section of the ferrite core.

The invention has the advantage that the combination of the features "geometric position of the two end faces of the ferrite core" and "disk-shaped ring" attains two positive effects at the same time:
  very good shielding against external electromagnetic fields, and
  substantially constant electromagnetic coupling conditions, even when the flange disk is shifted axially and radially.

In accordance with another advantageous feature of the invention, the flange disk and the disk-shaped ring are made in one piece, preferably made by turning.

In accordance, with another advantageous feature of the invention, a MU metal ring for concentrating and guiding the magnetic energy flow is embedded in the plastic filling and arranged such that the scattering of the magnetic field ones is low and the transfer of energy into the receiving coil is at a maximum. This also reduces the influence of external electromagnetic interference fields.

In accordance with another advantageous feature of the invention, provision is made for an ring-shaped recess in the plastic filling, into which recess the short section of the ferrite core protrudes, with the recess being at least 50% wider than the short section.

BRIEF DESCRIPTION OF THE DRAWING

The system for wirelessly supplying a rotating device with electrical energy will be explained in greater detail hereinafter with reference to schematic drawings.

DETAILED DESCRIPTION OF PREFERRED EMBODIMENTS

Figure 1:
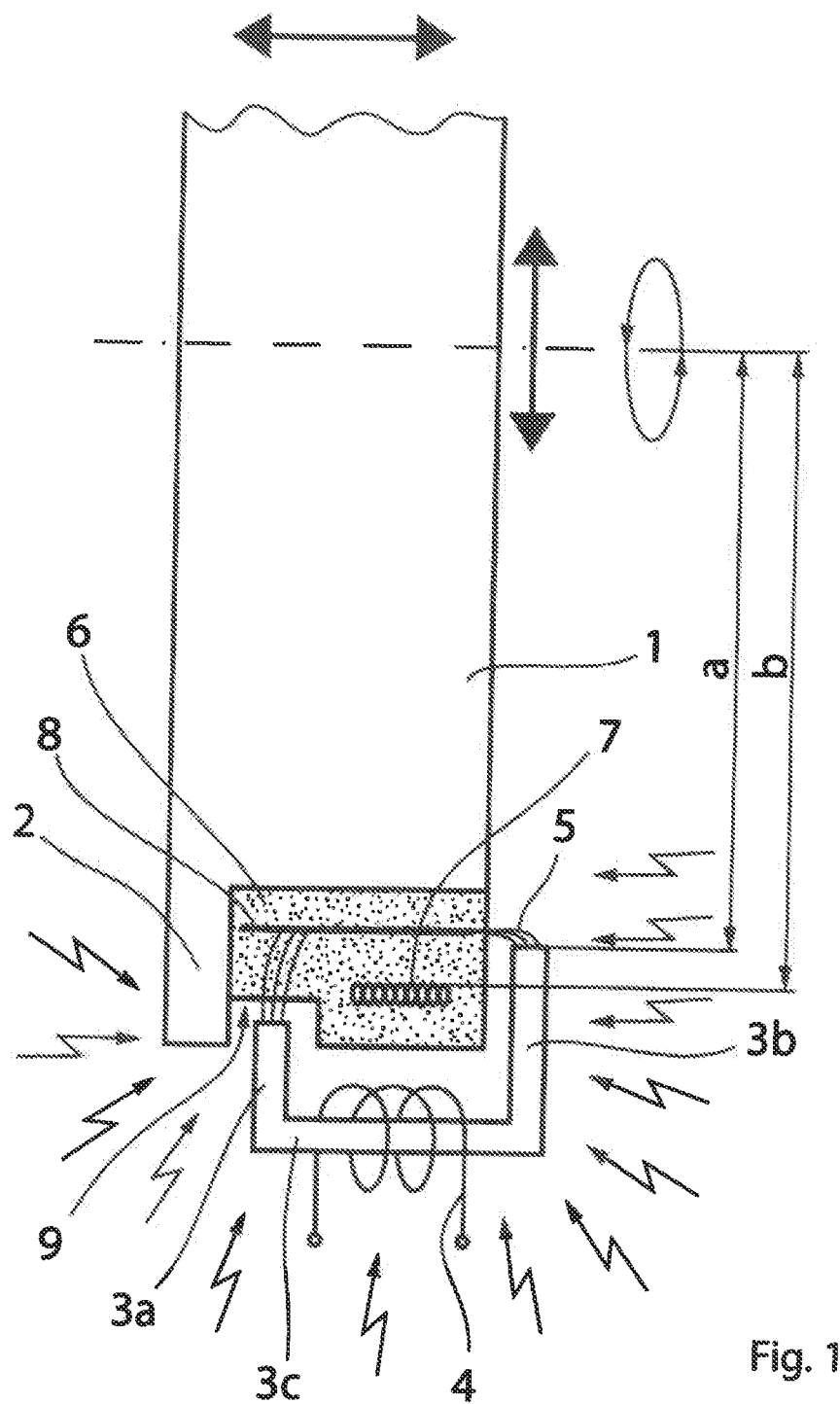
FIG. 1 shows a first embodiment of the system.
Figure 2:
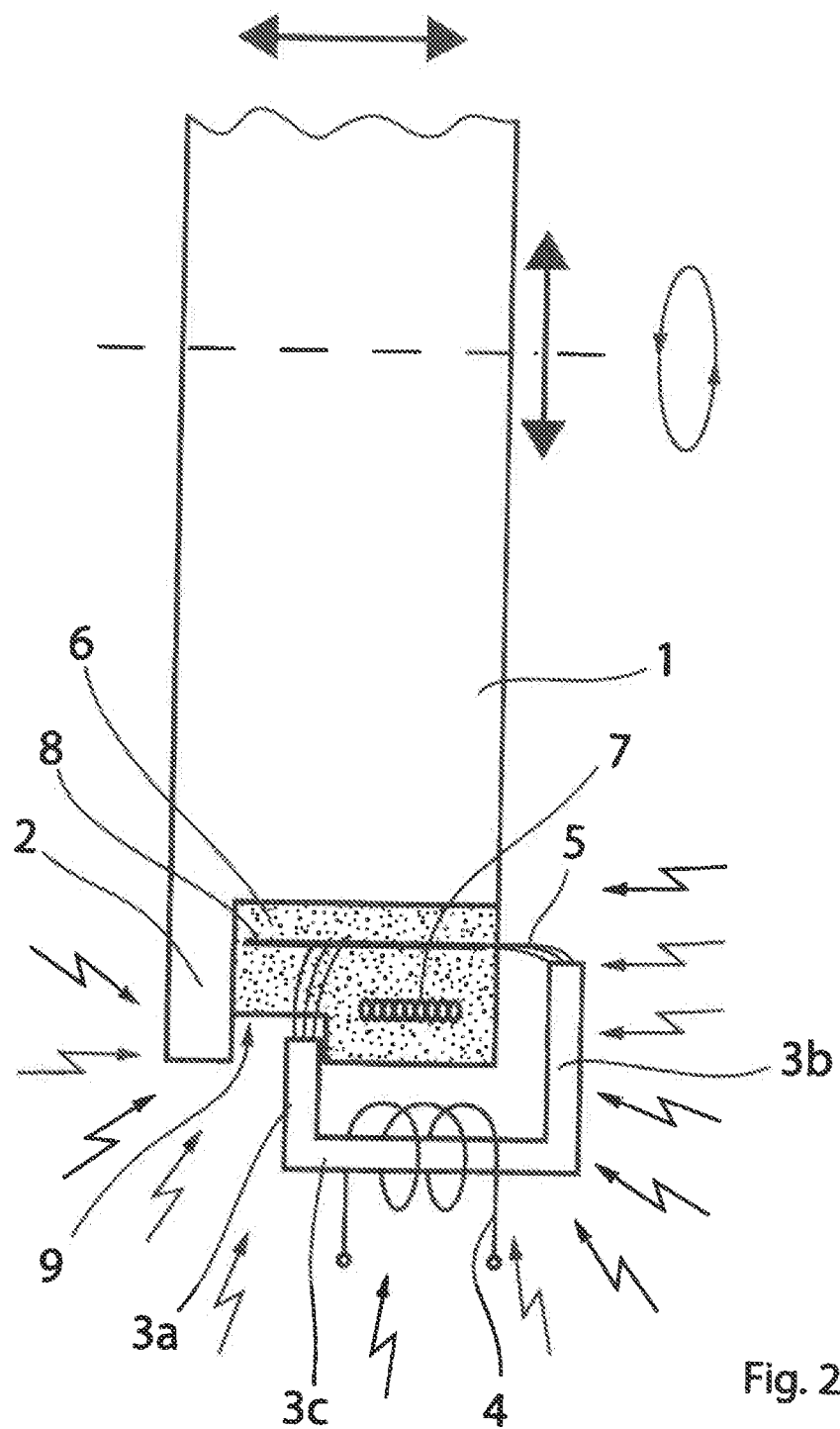
FIG. 2 shows a first possible axial displacement of the flange disk.
Figure 3:
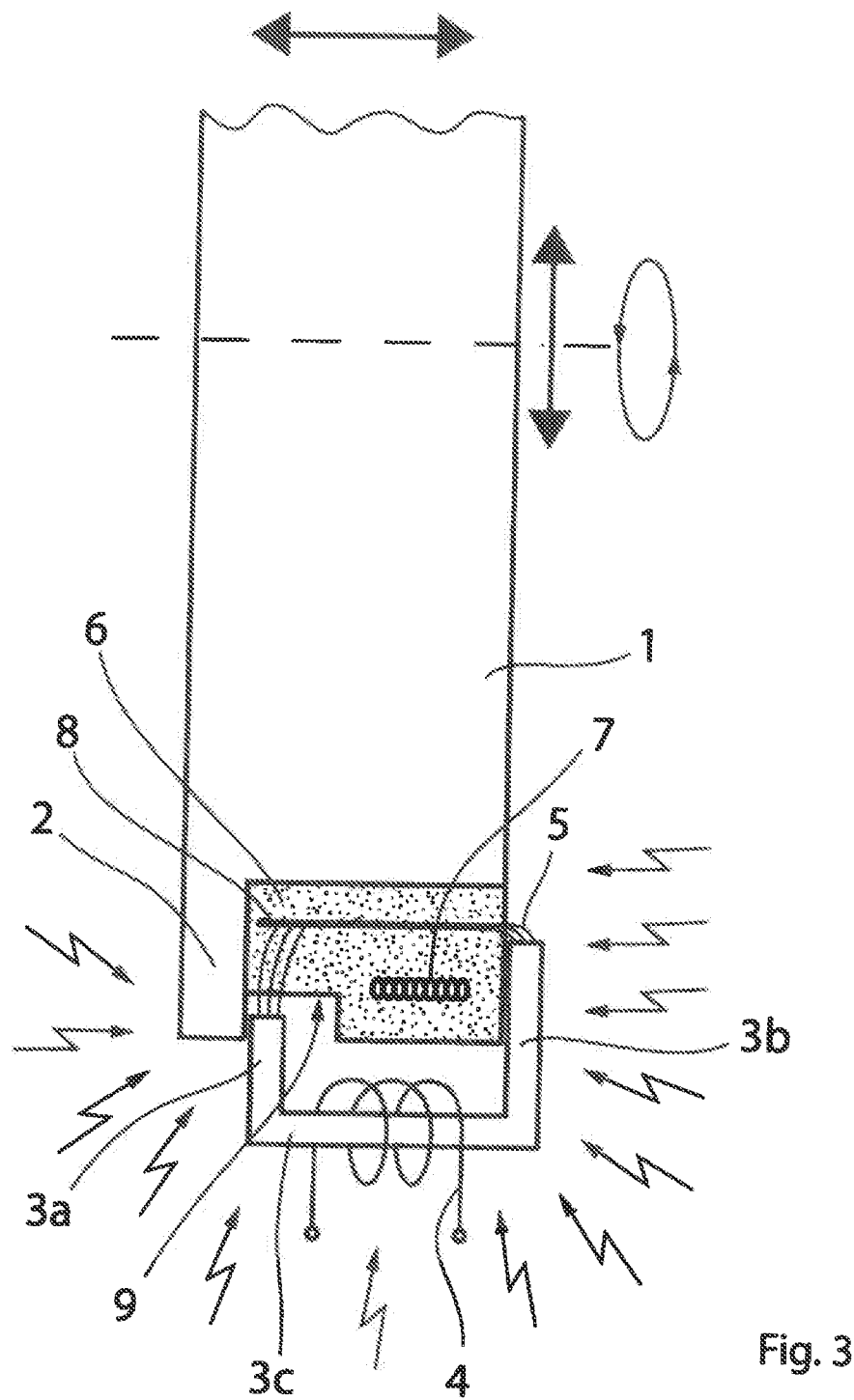
FIG. 3 shows a second possible axial displacement of the flange disk.
Figure 4:
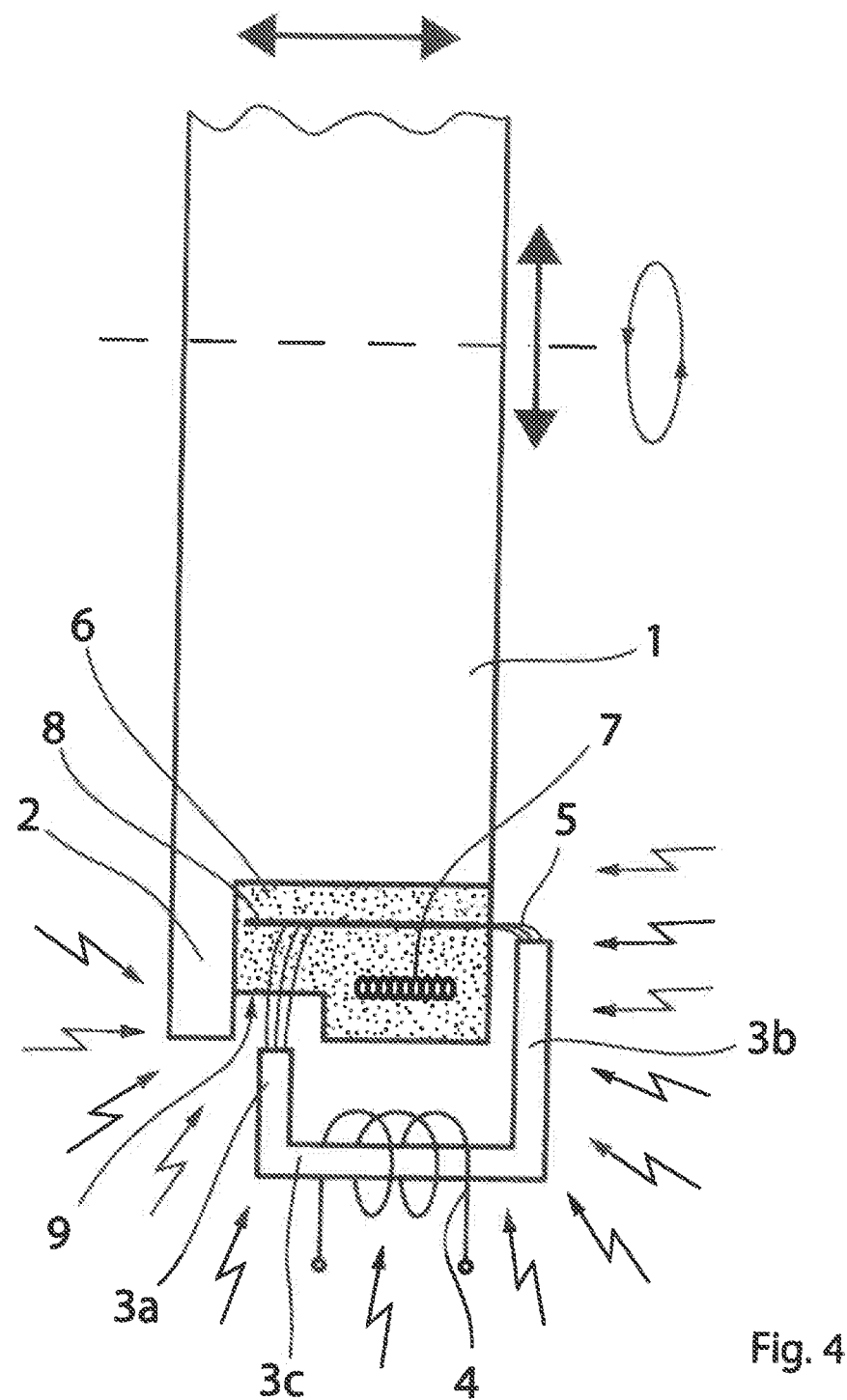
FIG. 4 shows a first possible radial displacement of the flange disk.
Figure 5:
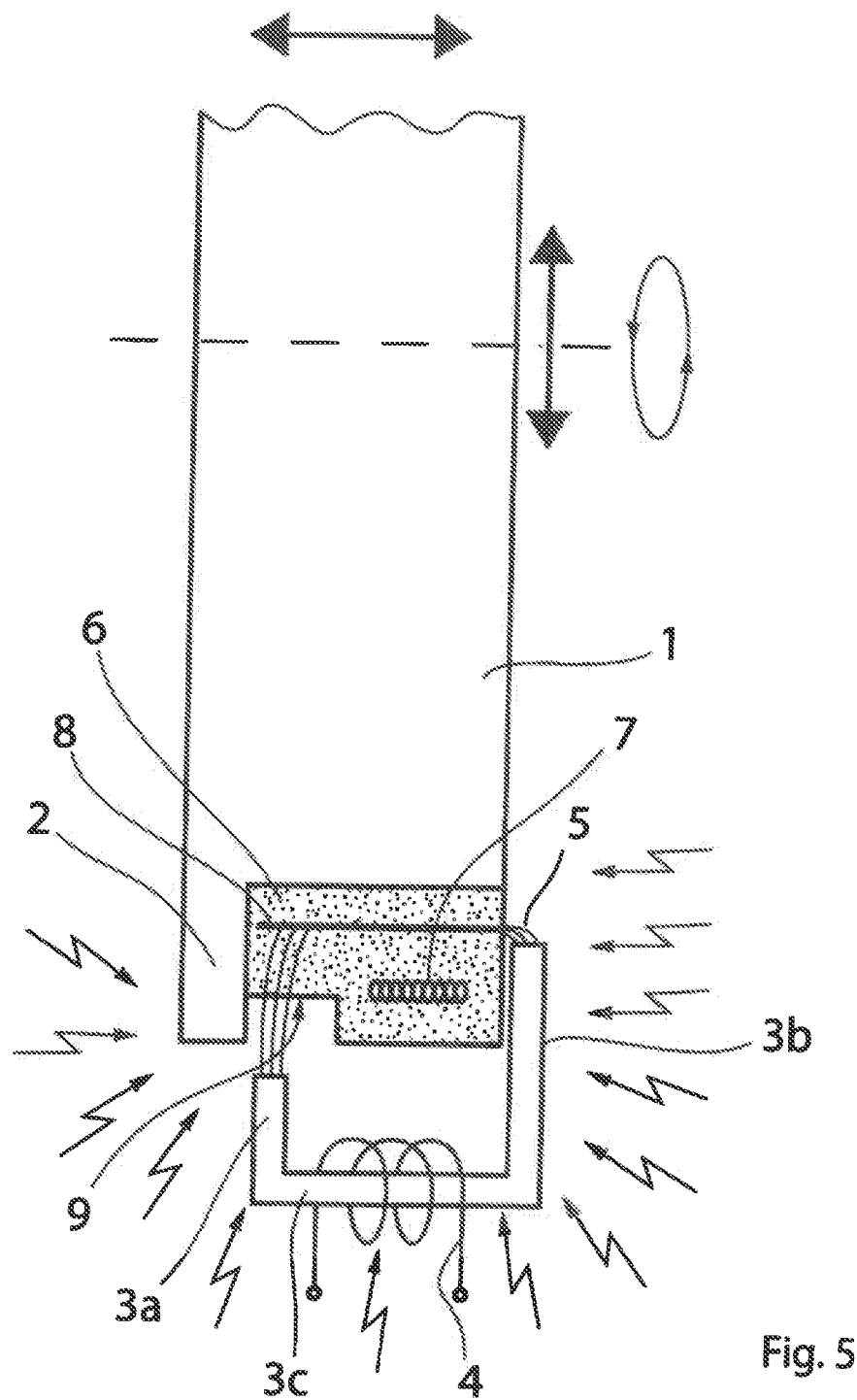
FIG. 5 shows a second possible radial displacement of the flange disk.
Figure 11:
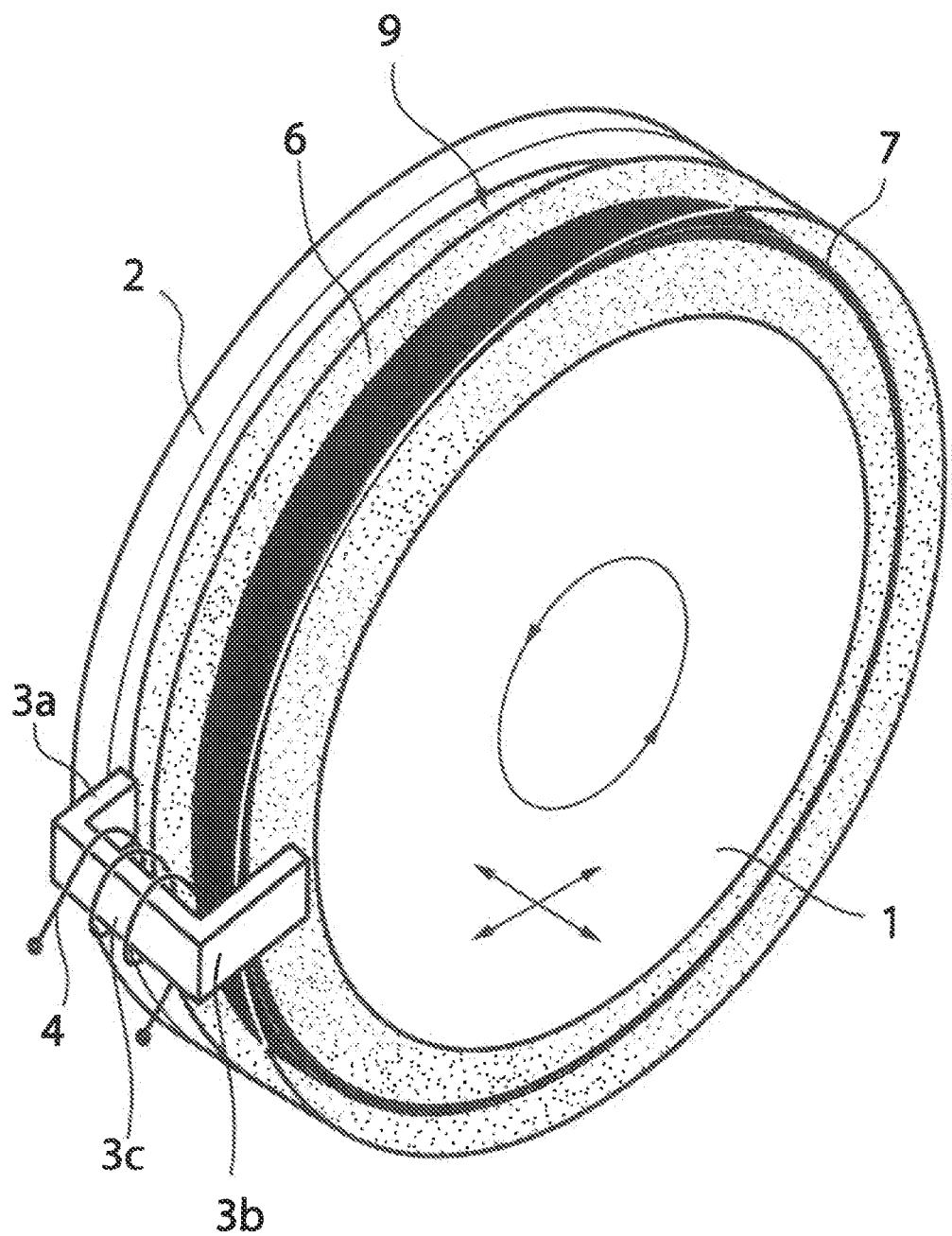
FIG. 11 shows a perspective view of the system.

FIG. 1 shows in conjunction with FIG. 11 a first embodiment of the system. A flange disk 1 of steel has an outer end face and an inner end face, with the flange disk 1 being one of both flange disks of a typical, widespread torque measuring flange, which can be installed e.g. in an engine test bench for measuring the drive torque of an electric motor. A disk-shaped ring 2 has an inner side and an outer side, with the outer side of the disk-shaped ring 2 lying in a plane with the inner end face of the flange disk 1. In this embodiment, the ring 2 is an integral part of the flange disk 1, with this unit being made in one piece by machining, e.g. by turning. A ring-shaped plastic filling 6 is secured to the circumferential surface of the flange disk 1 and has a lateral outer surface which lies in a plane to the outer end face of the flange disk 1. A receiving coil 7 made of revolving wire windings is embedded in the ring-shaped plastic filling. A particularly shaped U-shaped ferrite core has a short section 3a and a long section 3b, which are connected to one another via a section 3c. The end face of the short section 3a is directed towards the plastic filling 6. The long section 3b, which is aligned parallel to the short section 3a, extends parallel along the outer surface of the ring-shaped plastic filling 6. The distance a of the end face of the long section from the rotation axis of the flange disk is smaller than the distance b of the receiving coil from the rotation axis of the flange disk. A MU metal ring 8 for concentrating and guiding the magnetic energy flow is embedded in the plastic filling and is arranged in such a way that the scattering of the magnetic field lines is low and the transfer of the energy into the receiving coil is at a maximum. This also reduces the influence of external electromagnetic interference fields. Furthermore, provision is made in the plastic filling 6 for a recess 9, into which the short section 3a protrudes. When a voltage is applied to an induction coil system 4, which is in an inductively operative connection with the ferrite core, a magnetic energy flow 5 is formed between the end face of the short section and the end face of the long section of the ferrite core. This energy flow 5 is symbolically represented by the magnetic field lines. This arrangement provides good shielding against external electromagnetic interference, which is symbolically represented by the lightning arrows. The two double arrows symbolize possible movements of the flange disk 1 in these directions. As it turns out, these movements do not cause any significant changes in the energy transfer, not even when the positions shown in FIGS. 2 to 5 are reached.

Figure 6:
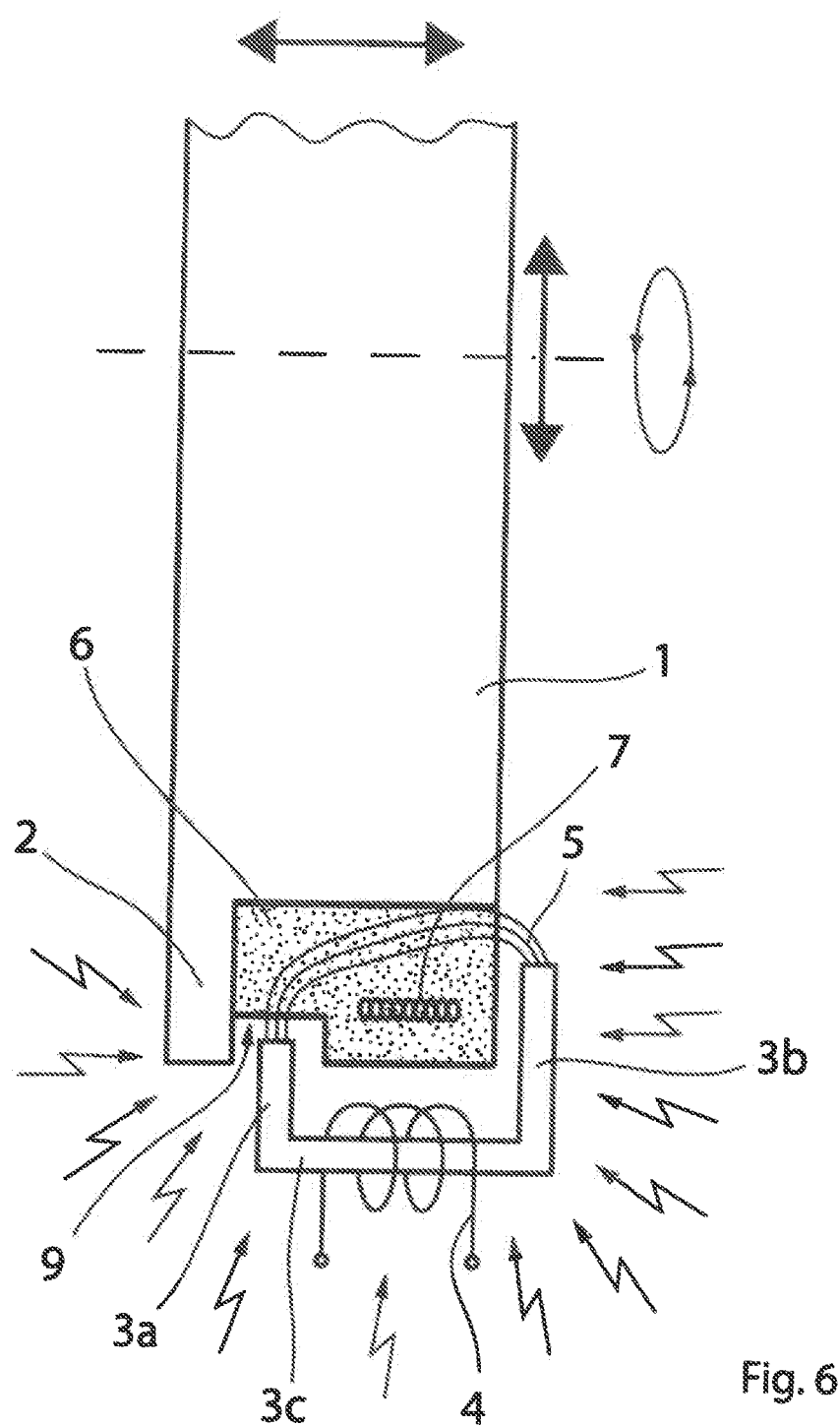
FIG. 6 shows a second embodiment of the system.
Figure 7:
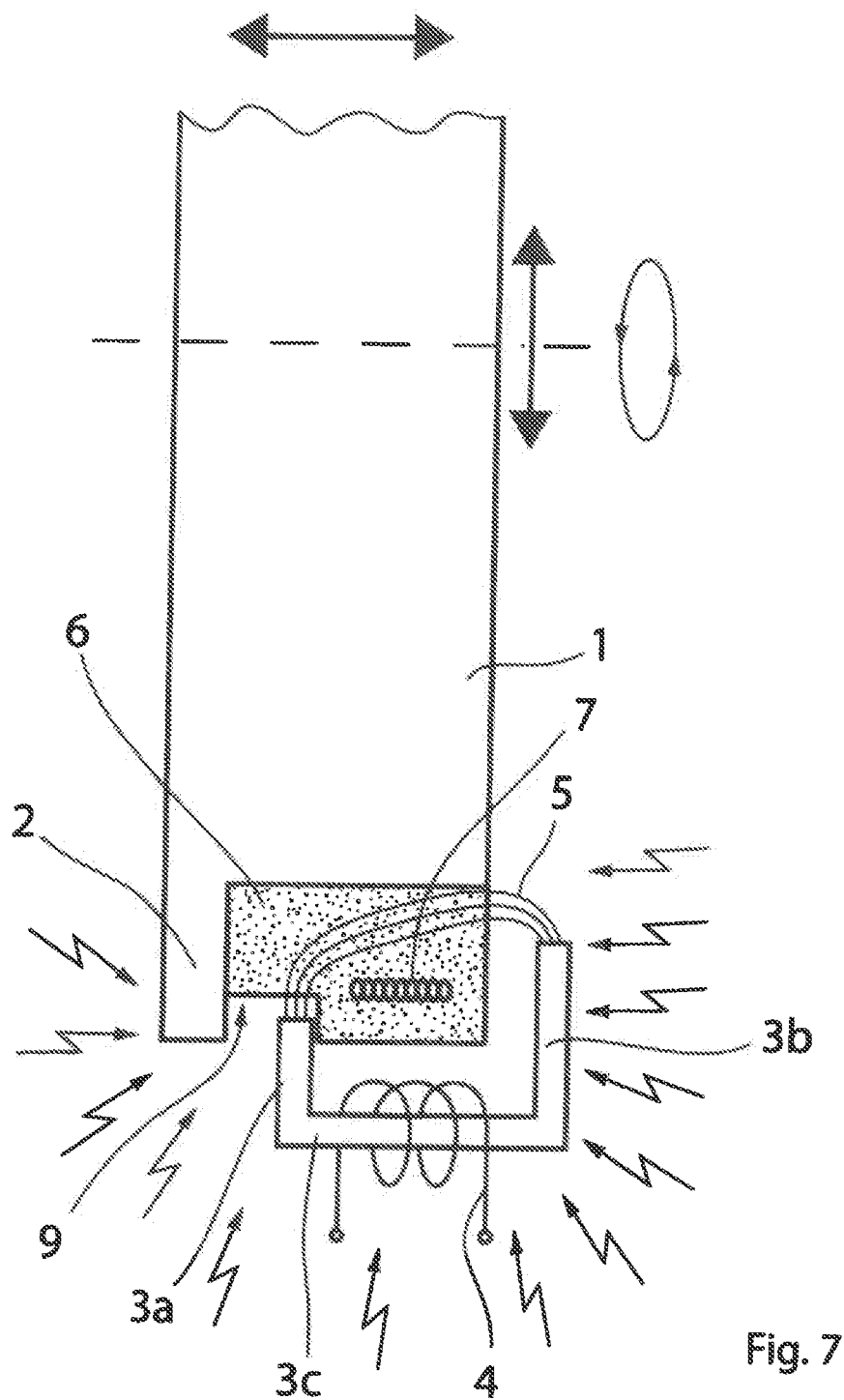
FIG. 7 shows a first possible axial displacement of the flange disk.
Figure 8:
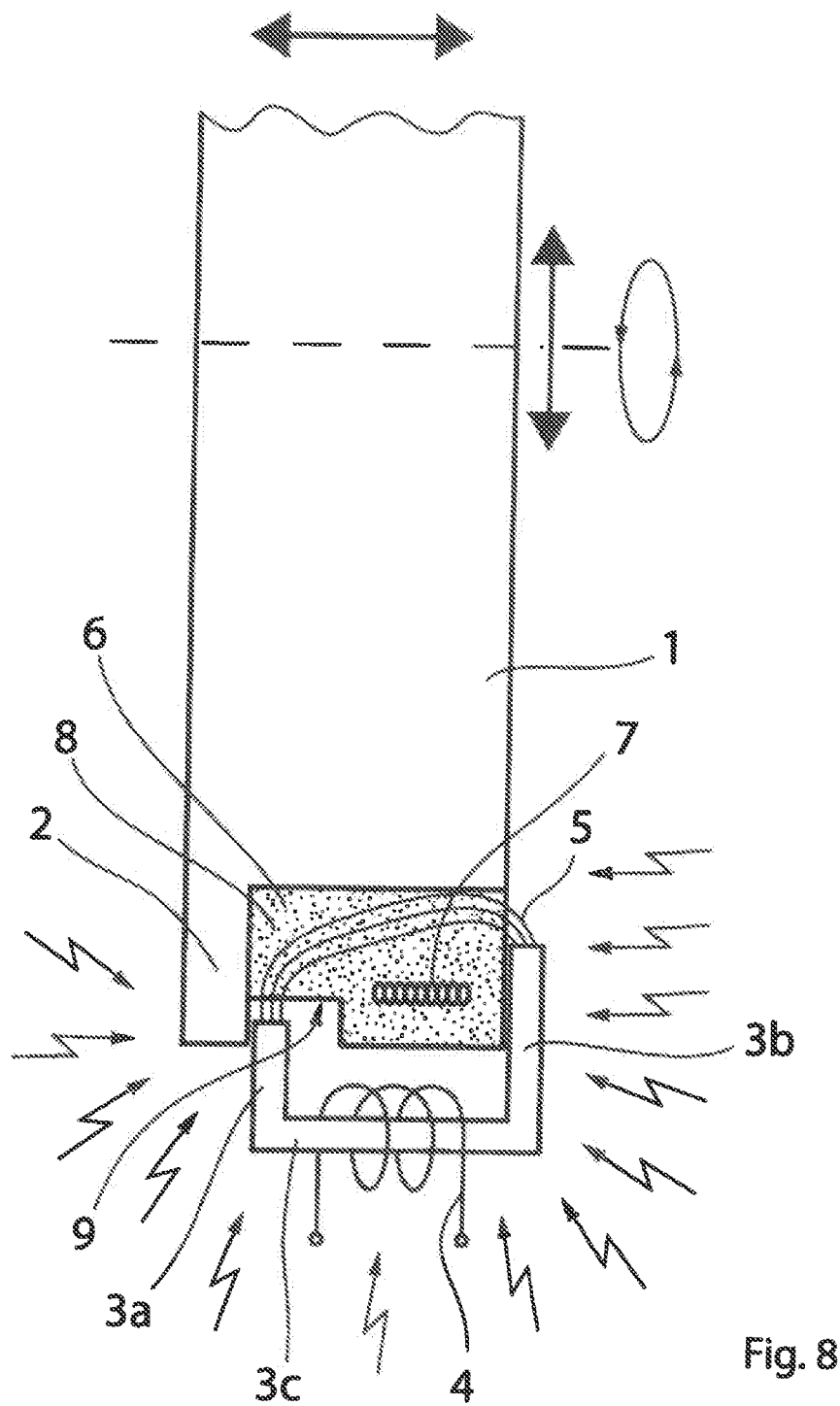
FIG. 8 shows a second possible axial displacement of the flange disk.

Surprisingly, it has been found that in the arrangement according to FIG. 6, shifts in position, as shown in FIGS. 7 and 8, do not cause any significant changes in the energy transfer.

Figure 9:
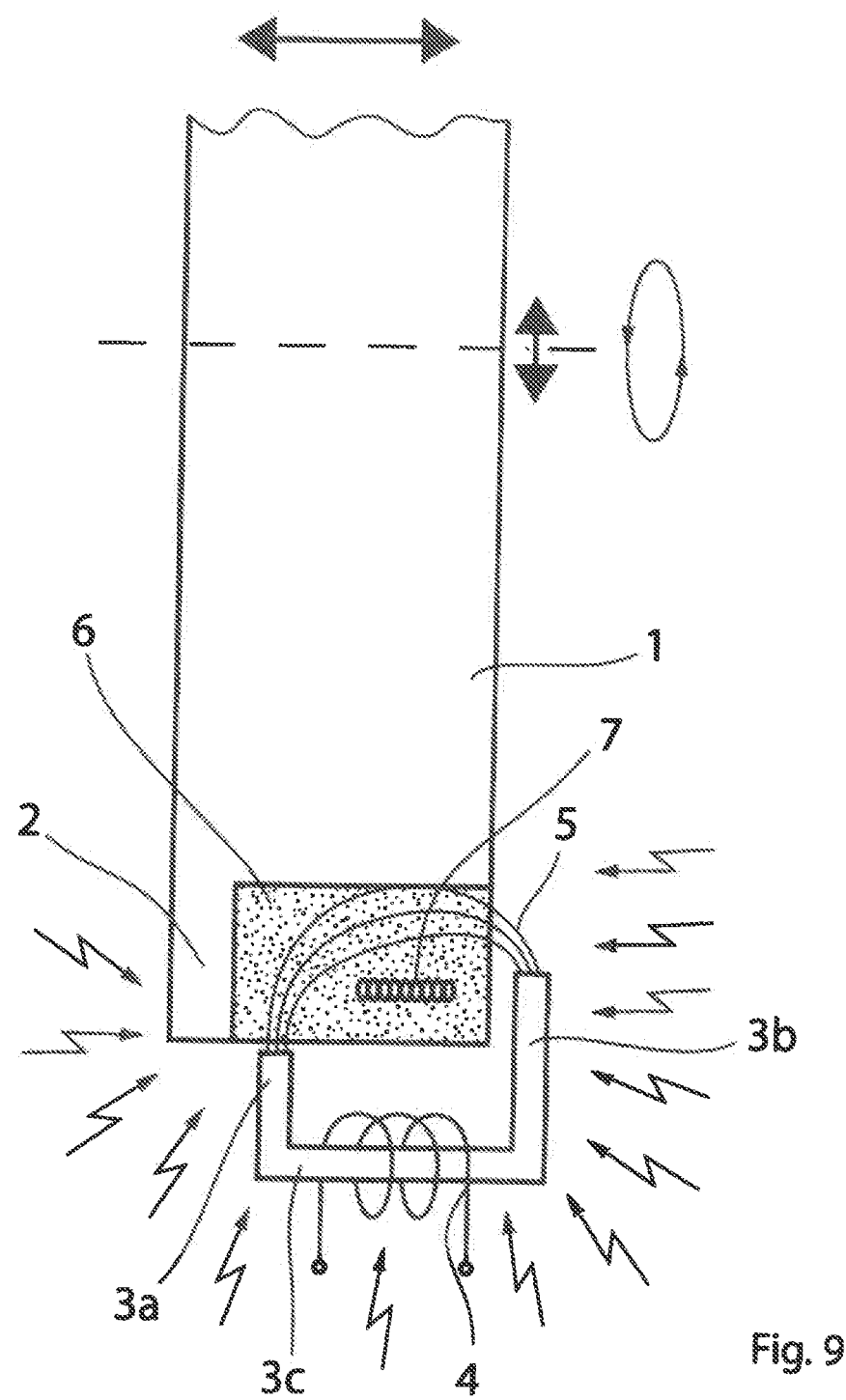
FIG. 9 shows a third embodiment of the system and the flange disk in a first axially and radially displaced position.
Figure 10:
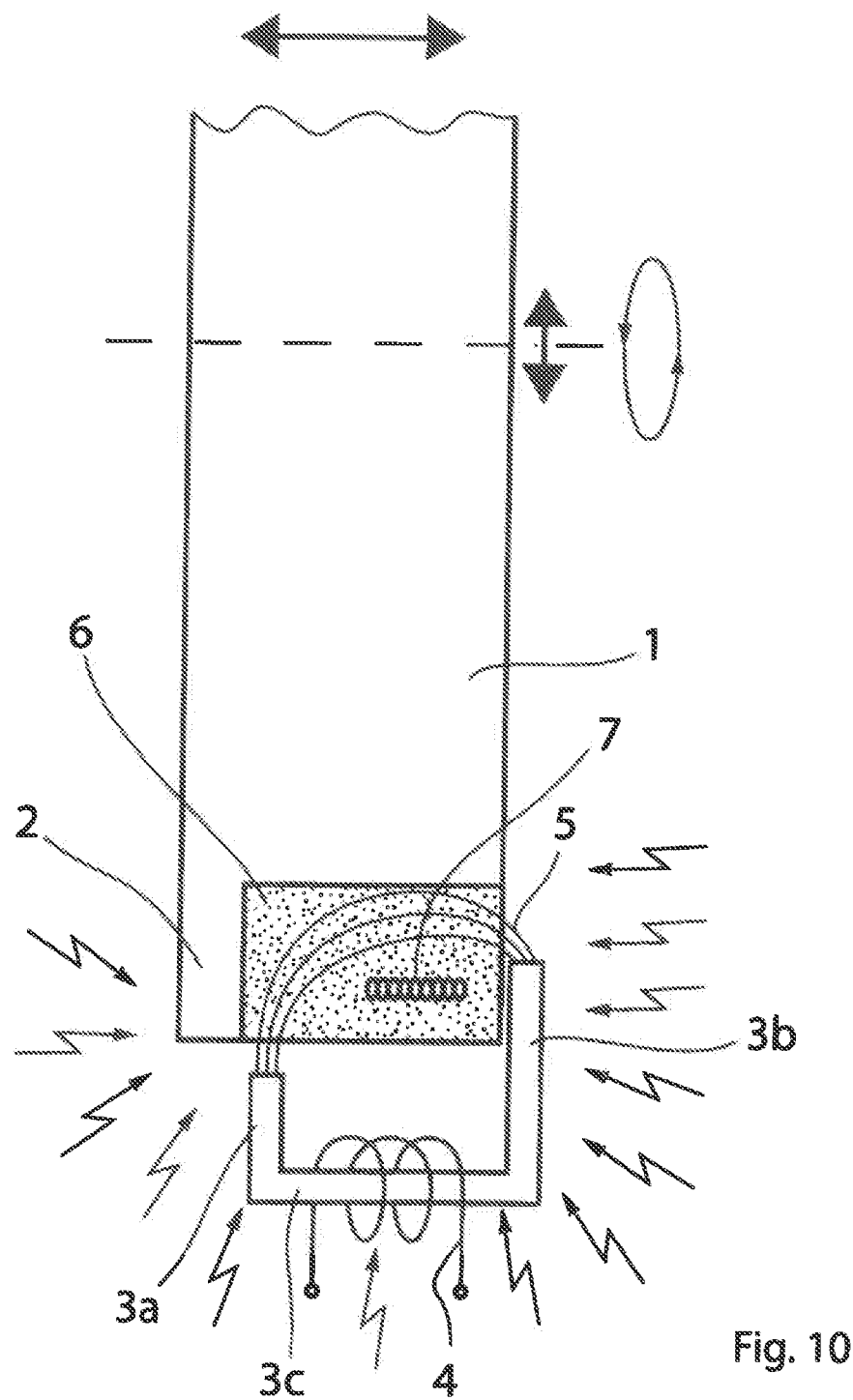
FIG. 10 shows the third embodiment of the system and the flange disk in a second axially and radially displaced position.

In the arrangement according to FIG. 9, the ring-shaped recess in the plastic filling 6 has been omitted. It has been found that this arrangement enables a particularly large axial displacement of the flange disk 1, although slightly narrower tolerances must be observed for the radial displacement. The good shielding against external electromagnetic fields is retained.

What is claimed is:

1. A system for wirelessly supplying a rotating device with electrical energy, said system comprising:
   a flange disk mounted for rotation about a rotation axis and having an outer end face and an inner end face, said flange disk being one of two flange disks of a torque measuring flange and made of steel, titanium, aluminum or an alloy with comparable property;
   a disk-shaped ring having an inner side and an outer side, with the outer side of the disk-shaped ring lying in a plane with the inner face of the flange disk;
   a ring-shaped plastic filling secured to a circumferential surface of the flange disk and having an outer surface which lies in a same plane to the outer end face of the flange disk;
   a U-shaped ferrite core having a first section, a second section and a third section, with the first section sized shorter than the second section and the third section connecting the first and second sections to one another, said first section having an end face directed towards the ring-shaped plastic filling, said second section aligned parallel to the first section and extending parallel along the outer surface of the ring-shaped plastic filling, said second section having an end face at a first distance from the rotation axis of the flange disk;
   an induction coil system in inductive operative connection with the ferrite core, said induction coil system arranged to the flange disk such that when a voltage is applied to the induction coil system, a magnetic energy flow is formed between the end face of the first section and the end face of the second section; and
   a receiving coil embedded in the ring-shaped plastic filling and made of revolving wire windings, said receiving coil arranged from the rotation axis of the flange disk at a second distance, with the first distance being smaller than the second distance,
   wherein the ring-shaped plastic filling has a ring-shaped recess, into which the first section of the ferrite core protrudes, said recess having a width which is at least 50% wider than a width of the first section.

2. A system, comprising:
   a rotating device designed for being wirelessly supplied with electrical energy, said rotating device comprising
   a flange disk mounted for rotation about a rotation axis and having an outer end face and an inner end face, said flange disk being one of two flange disks of a torque measuring flange and made of steel, titanium, aluminum or an alloy with comparable property;
   a disk-shaped ring having an inner side and an outer side, with the outer side of the disk-shaped ring lying in a plane with the inner end face of the flange disk;
   a ring-shaped plastic filling secured to a circumferential surface of the flange disk and abutting a lateral surface of the disk-shaped ring and having an outer surface which lies in a same plane as the outer end face of the flange disk and defining a ring-shaped radial recess disposed between the ring-shaped plastic filling and the disk-shaped ring; and
   a receiving coil embedded in the ring-shaped plastic filling and made of revolving wire winding;
   a U-shaped ferrite having a first section, a second section and a third section, with the first section sized shorter than the second section and the third section connecting the first and second sections to one another, said first section having an end face directed towards the ring-shaped plastic filling and protruding radially into the ring-shaped radial recess, said second section aligned parallel to the first section and extending parallel along the outer surface of the ring-shaped plastic filling, said second section having an end face at a first distance from the rotation axis of the flange disk; and an induction coil system in inductive operative connection with the ferrite core, said induction coil system producing a magnetic energy flow between the end face of the first section and the end face of the second section;

wherein the receiving coil is arranged from the rotation axis of the flange disk at a second distance greater than the first distance.

3. The system of claim 2, wherein the disk-shaped ring forms an integral part of the flange disk to establish a one-piece structure.

4. The system of claim 2, further comprising a MU metal ring embedded in the plastic filling for concentrating and guiding the magnetic energy flow, thereby reducing scattering of magnetic field lines and maximizing a transfer of energy into the receiving coil.

5. The system of claim 2, wherein the recess has a width which is at least 50% wider than a width of the first section.

\* \* \* \* \*